United States Patent
Yu et al.

(10) Patent No.: US 10,604,604 B2
(45) Date of Patent: Mar. 31, 2020

(54) MULTIMODAL POLYOLEFIN RESIN, AND MOLDED BODY MANUFACTURED THEREFROM

(71) Applicant: DAELIM INDUSTRIAL CO., LTD., Seoul (KR)

(72) Inventors: Seung Tack Yu, Gyeonggi-do (KR); Byung Keel Sohn, Daejeon (KR); Yong Jae Jun, Daejeon (KR); Young Shin Jo, Daejeon (KR); Ki Soon Park, Daejeon (KR); Jin Sook Oh, Daejeon (KR); Sang Won Yu, Daejeon (KR); Man Jung Kim, Daejeon (KR); Dug Hoon Sung, Daejeon (KR); Hee Suk Kim, Daejeon (KR); Hae Guen Jeong, Daejeon (KR)

(73) Assignee: DAELIM INDUSTRIAL CO., LTD., Seoul (KR)

( * ) Notice: Subject to any disclaimer, the term of this patent is extended or adjusted under 35 U.S.C. 154(b) by 152 days.

(21) Appl. No.: 15/771,211

(22) PCT Filed: Oct. 27, 2016

(86) PCT No.: PCT/KR2016/012197
§ 371 (c)(1),
(2) Date: Apr. 26, 2018

(87) PCT Pub. No.: WO2017/074077
PCT Pub. Date: May 4, 2017

(65) Prior Publication Data
US 2018/0305481 A1   Oct. 25, 2018

(30) Foreign Application Priority Data
Oct. 28, 2015 (KR) .................. 10-2015-0150471

(51) Int. Cl.
*C08F 210/16* (2006.01)
*C08J 5/00* (2006.01)
*C08F 4/659* (2006.01)

(52) U.S. Cl.
CPC ............. *C08F 210/16* (2013.01); *C08J 5/00* (2013.01); *C08F 4/65912* (2013.01);
(Continued)

(58) Field of Classification Search
CPC ............. C08F 210/16; C08F 4/65912; C08F 4/65916; C08F 2800/10; C08F 2800/20; C08J 5/00; C08J 2323/08
See application file for complete search history.

(56) References Cited

FOREIGN PATENT DOCUMENTS

| KR | 20010006451 A | 1/2001 |
| KR | 1020080077284 A | 8/2008 |

(Continued)

OTHER PUBLICATIONS

International Search Report dated Jan. 31, 2017 corresponding to application No. PCT/KR2016/012197.

*Primary Examiner* — Michael C Miggins
(74) *Attorney, Agent, or Firm* — Nath, Goldberg & Meyer; Tanya E. Harkins; Joshua B. Goldberg

(57) ABSTRACT

Multimodal polyolefin resins for manufacturing films, pipes, hollow molded articles having high melt strength and excellent formability, mechanical strength, processability and appearance are described. The resins have: density is 0.930-0.960 g/cm$^3$; melt flow index is 0.01-10.0 g/10 minutes; ratio Mw/Mn is 10-60; and two or more peaks appear when molecular weight is measured by GPC. In molded pipe, the Mw of polymer collected at position B is 0.1% greater than Mw of polymer collected at position A; polymer having Mw of 10,000 or less among polymers collected at position A is 0.1% greater than the amount of polymer having Mw of (Continued)

10,000 or less among polymers collected at position B; and the amount of polymer having Mw of 1,000,000 or more among polymers collected at position B is 0.1% greater than the amount of polymer having Mw of 1,000,000 or more among polymers collected at position A.

22 Claims, 3 Drawing Sheets

(52) U.S. Cl.
CPC ...... *C08F 4/65916* (2013.01); *C08F 2800/10* (2013.01); *C08F 2800/20* (2013.01); *C08J 2323/08* (2013.01)

(56) References Cited

FOREIGN PATENT DOCUMENTS

| | | |
|---|---|---|
| KR | 1020080104331 A | 12/2008 |
| KR | 1020130111042 A | 10/2013 |
| KR | 1020140085581 A | 7/2014 |
| WO | 2014206854 A1 | 12/2014 |

MULTIMODAL POLYOLEFIN RESIN, AND MOLDED BODY MANUFACTURED THEREFROM

This is a National Phase Application filed under 35 U.S.C. 371 as a national stage of PCT/KR2016/012197, filed Oct. 27, 2016, an application claiming the benefit of Korean Application No. 10-2015-0150471, filed Oct. 28, 2015, the content of each of which is hereby incorporated by reference in its entirety.

TECHNICAL FIELD

This invention relates to a multimodal polyolefin resin and a molded product prepared with the same, and more particularly, to a multimodal polyolefin resin having high melt strength and excellent moldability, mechanical strength, processability and external appearance and a molded product article prepared with the same.

BACKGROUND ART

To use a polyolefin resin for specific applications, the polyolefin resin should have superior toughness, strength, environmental stress and crack resistance etc. Such characteristics can be easily improved by increasing molecular weight of the polyolefin resin, however, this disadvantageously deteriorates the moldability of the polyolefin resin. Because of the disadvantages of such polyolefin resins, it is preferable to use a polyolefin resin having a single physical property alone while adjusting the structure of the polymer or using a suitable processing aid, rather than using polyolefin resins having different physical properties. However, generally the polyethylene resin prepared with Ziegler-Natta and metallocene catalyst has narrow molecular weight distribution, thus if used alone, various problems may occur. Thus, using a polymer having a broad molecular weight distribution or a multimodal molecular weight distribution, the moldability of the polyolefin resin can be improved with maintaining characteristics of toughness, strength, environmental stress, crack resistance and melt strength etc., thereby solving the disadvantage of the polyolefin resin having narrow molecular weight distribution.

The polyolefin having multimodal molecular weight distribution is a polyolefin containing at least two components each having different molecular weight, and for example, includes a high molecular weight component and a low molecular weight component in relatively proper proportions. Many studies have been conducted for the preparation of a polyolefin having broad molecular weight distribution or multimodal molecular weight distribution. One method among them is a post-reactor process or a melting blending process in which polyolefins having at least two different molecular weights are blended before or during the processing of the polyolefin. For example, U.S. Pat. No. 4,461,873 discloses a blending method of physically bending two different kinds of polymers for preparing a bimodal polymer blend. When such a physical blending method is used, it is liable to produce a molded form having high gel component, a product appearance is deteriorated owing to the gel component, and thus the polyolefin cannot be used for the films. Further, the physical blending method requires a complete uniformity, so there is a disadvantage of the preparing cost being increased.

Another method for preparing polyolefin having multimodal molecular weight distribution, for example bimodal molecular weight distribution is to use a multistage reactor. In the multistage reactor which includes two or more reactors, a first polymer component having one molecular weight distribution among two different molecular weight distribution of the bimodal polymer, is prepared in a certain condition at a first reactor, the first polymer component prepared is transferred to a second reactor, and then a second polymer component having different molecular weight distribution from that of the first polymer component, is prepared in a different condition from that of the first reactor, at the second reactor. The above-mentioned method solves the problems relating to the gel component, but it uses the multistage reactor, so the production efficiency may be decreased or the production cost may be increased. Also, when the high molecular weight components are prepared in the first reactor, the low molecular weight components are not prepared in the second reactor and thus the finally manufactured polyolefin particles may be made only by the high molecular weight components.

Still another method for preparing polyolefin having broad molecular weight distribution or multimodal molecular weight distribution is to polymerize the polyolefin by using a mixture of catalysts in a single reactor. Recently, in the pertinent art, the various attempts have been made for producing polyolefin having broad molecular weight distribution or multimodal molecular weight distribution, by using two or more different catalysts in a single reactor. In this method, the resin particles are uniformly mixed in a level of sub-particles, thus the resin components each having different molecular weight distribution exists in a single phase. For example, U.S. Pat. Nos. 4,530,914 and 4,935,474 disclose a method for producing a polyolefin having a broad molecular weight distribution by polymerizing ethylene or higher alpha-olefins in the presence of a catalyst system comprising two or more metallocenes and aluminoxanes having different reaction development and termination rate constants. Also, U.S. Pat. Nos. 6,841,631 and 6,894,128 disclose a method for preparing polyethylene having bimodal or multimodal molecular weight distribution by using a metallocene-type catalyst comprising at least two metal compounds and the usage of the polyethylene for manufacturing films, pipes, hollow molded articles and so on. Polyethylene produced in this way has a good processability, but the dispersed state of the polyethylene component per the molecular weight in unit particle is not uniform, so there are disadvantages of rough appearance and unstable physical properties even in relatively good processing conditions.

U.S. Pat. No. 4,937,299 discloses a method for preparing polyolefin by using a catalyst system comprising at least two kinds of metallocenes each having different reactivity ratio with respect to monomer to be polymerized. U.S. Pat. No. 4,808,561 discloses a method for preparing olefin polymerization supported catalyst by reacting metallocene with alumoxane in the presence of a carrier. The metallocene is supported in the carrier to form solid power catalyst. As the carrier, inorganic oxide materials such as silica, alumina, silica-alumina, magnesia, titania, zirconia and the mixture thereof, and resinous materials such as polyolefin (for example, finely divided polyethylene) can be employed, and the metallocenes and alumoxanes are deposited on the dehydrated carrier material.

Generally, since the polymer prepared with Ziegler-Natta catalyst alone or metallocene catalyst system has a narrow molecular weight distribution, it is not made to prepare the satisfactory polyolefin which has a multimodal molecular weight distribution or broad molecular weight distribution. Accordingly, in the related art, a method has been known for preparing a bimodal resin by using a mixture catalyst system containing Ziegler-Natta catalyst and metallocene catalyst components. The mixture catalyst system typically includes a combination of heterogeneous Ziegler-Natta catalysts and homogeneous metallocene catalyst. The mixture catalyst system is used for preparing the polyolefin having a broad molecular weight distribution or bimodal molecular weight distribution, to adjust the molecular weight distribution and polydispersity of the polyolefin.

U.S. Pat. No. 5,539,076 discloses a mixture catalyst system of metallocene/non-metallocene for preparing a specific bimodal high-density copolymer. The catalyst system is supported by an inorganic carrier. The mixture catalyst of Ziegler-Natta and metallocene supported has relatively low activity than single uniform catalyst, so it is difficult to prepare polyolefin having properties suitable for a specific use. In addition, since polyolefin is prepared in a single reactor, the gel which is generated in the blending method may be produced, it is difficult to insert comonomer to high molecular weight components part, the form of polymer produced may be poor and further two polymer components may not be uniformly mixed, so the quality control of the produced polyolefin may be difficult.

Korean Patent No. 1437509 discloses a catalyst composition and a polymerization method for producing multimodal polyolefin resins having a low extrusion load and much extrusion amount during the molding to have excellent productivity. The resin is a mixture of two or more different kinds of polymers, so it exhibits excellent processability despite a high molecular weight and a low melt flow index. However, this resin has a rough surface when machining large diameter pipes. Journal of POLYMER ENGINEERING AND SCIENCE, JULY 2004, Vol. 44, No. 7 1283-1294 discloses that in the extrusion molding, when the molten resin undergoes high stress, there is a difference in elastic energy according to the position inside the extruder, and the polymer chains move to be energy equilibrium. In bimodal or multimodal polyolefin, the difference in the molecular weight of each polymer chain is larger than that of general monodomain polyolefin, therefore, the elastic energy difference is high, and the movement of the polymer chains is easier. For this reason, it is difficult to evenly distribute the molecules, which may cause problems such as surface roughness.

In addition, conventional bimodal products have a great difference in elastic energy between polymer chains, and when the polymer undergoes high stress at the time of processing, the polymer chains having relatively low molecular weight and low elastic energy move toward the wall surface of the extruder having high stress and polymer chains with high molecular weight and high elastic energy move into the center having relatively low stress. As a result, the polymer chains having low molecular weight are distributed in the outer surface of a molded product (for example, a pipe), and problems of surface roughness and melt fracture (phenomenon that the surface is not smooth and ruggedly broken during polymer processing) are issued.

DISCLOSURE

Technical Problem

It is an object of the present invention to provide a multimodal polyolefin resin having a uniform distribution of polymer chains throughout the formed article, for which the melt strength is increased to inhibit polymer chains having relatively low molecular weights which are caused from energy differences in extrusion molding from moving outside. Another object of the present invention is to provide a multimodal polyolefin resin having a molecular weight, a molecular weight distribution, and a melt flow index ratio (SR) of an appropriate range so as to mold for pipes and films etc. under high stress extrusion conditions It is another object of the present invention is to provide a multimodal polyolefin resin which has a low extrusion load in molding process, a low stress applied to a molten resin, a minimal difference in elastic energy between polymer chains and an excellent productivity. It is another object of the present invention is to provide a polyolefin resin molded article having excellent appearance characteristics and mechanical strength.

Technical Solution

To achieve the objects of the present invention according to one aspect, there is provided a polyolefin resin satisfying all the following requirements (1) to (7), and also according to another aspect, there is provided a polyolefin resin satisfying all the following requirements (1), (2), (8) and (9): (1) a density (d) is 0.930 to 0.960 g/cm$^2$; (2) a melt flow index (MIP, 190° C., 5.0 kg load condition) is 0.01 to 10.0 g/10 minutes; (3) a ratio (Mw/Mn, molecular weight distribution (MWD)) of weight average molecular weight (Mw) to number average molecular weight (Mn) is in the range from 10 to 60 as measured by gel permeation chromatography (GPC); (4) two or more peaks of molecular weight appear when measured by gel permeation chromatography (GPC); (5) in a molded pipe a weight average molecular weight (Mw) of the polymer taken at position B of Definition 1 below is 0.1% greater than a weight average molecular weight (Mw) of the polymer taken at position A; (6) in a molded pipe content of the polymer having a weight average molecular weight (Mw) of 10,000 or less in polymer taken at position A of Definition 1 below is 0.1% greater than the content of the polymer having a weight average molecular weight (Mw) of 10,000 or less in the polymer taken at position B; (7) in a molded pipe the content of the polymer having a weight average molecular weight (Mw) of 1,000,000 or greater in the polymer taken at position B of Definition 1 below is 0.1% greater than a content of the polymer having a weight average molecular weight (Mw) of 1,000,000 or greater in the polymer taken at position A; (8) in a molded pipe a Z average molecular weight (Mz) of the polymer taken at position B of Definition 1 below, which are measured by gel permeation chromatography (GPC), is 0.1% greater than a Z average molecular weight (Mz) of the polymer taken at position A; and (9) in molded pipe a Z+1 average molecular weight (Mz+1) of the polymer taken at position B of Definition 1 below, which are measured by gel permeation chromatography (GPC), is 0.1% greater than a Z+1 average molecular weight (Mz+1) of the polymer taken at position A.

[Definition 1]

In molded pipe having an SDR (SDR (Standard Dimension Ratio)=od/en) value of 2 to 20, $$\text{position } A = \frac{id}{2} + (en \times 0.4) - \frac{id}{2} + (en \times 0.6) \text{ From pipe center}$$

$$\text{position } B = \frac{id}{2} + (en \times 0.8) - \frac{id}{2} + (en \times 1.0) \text{ From pipe center}$$

wherein id means an inner diameter, od means an outside diameter, and en means a wall thickness.

Technical Effects

The multimodal polyolefin resin according to the present invention has a high melt strength for the distribution of the polymer chains throughout the formed article to be uniform and, also has small extrusion load during the molding, minimized elastic energy difference between the polymer chains, so the productivity is excellent. In addition, the multimodal polyolefin resin molded product according to the present invention is excellent in appearance characteristics and mechanical strength.

DETAILED DESCRIPTION OF INVENTION

Figure 1:
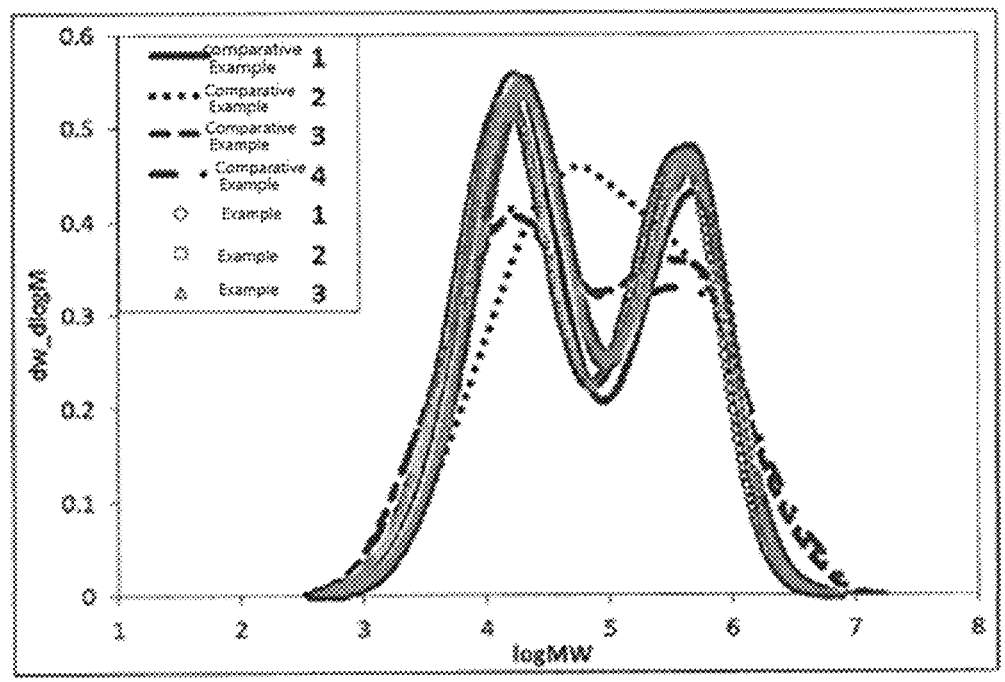
FIG. 1 illustrates GPC data of polyethylene obtained in Examples 1 to 3 of the present invention and Comparative Examples (Com. Examples) 1 to 4.

Hereinafter, the present invention will be described in detail with reference to the accompanying drawings. In the following description, upon necessity, the polyolefin resin is called just as polymer or polyolefin or also as ethylene-based polymer, polymer, high molecule, or olefin polymer.

The multimodal polyolefin resin of the present invention has a broad molecular weight distribution, for example, bimodal or multimodal molecular weight distribution. It is excellent in moldability, particularly suited to blow molding, extrusion molding and film molding, and it has excellent properties in appearance characteristics and mechanical strength of molded product. The polyolefin resin of the present invention satisfies all the following requirements (1) to (7) or the requirements (1), (2), (8) and (9), to secure good moldability.

(1) The density (d) is 0.930 to 0.960, preferably 0.934 to 0.954, and more preferably 0.940 to 0.954 g/cm$^2$.

(2) The melt flow index (MIP, 190° C., 5.0 kg load condition) is 0.01 to 10.0, preferably 0.1 to 1, and more preferably 0.2 to 0.5 g/10 minutes.

(3) The ratio (Mw/Mn, MWD, molecular weight distribution) of weight average molecular weight (Mw) to number average molecular weight (Mn) is 10 to 60, preferably 12 to 50, and more preferably 12 to 40. The measurement is performed using gel permeation chromatography. The weight average molecular weight is preferably 100,000 to 400,000, and more preferably 120,000 to 300,000.

(4) In the molecular weight measured by gel permeation chromatography (GPC), more than 2 peaks appear, where the polyolefin forming the peak with the highest molecular weight ($M_{Hp}$) improves the mechanical properties and the melt strength of the polymer resin and the polyolefin which forms the smallest molecular peak ($M_{Lp}$) functions to improve the moldability of the polymer resin.

(5) In the molded pipe, the weight average molecular weight (Mw) of the polymer collected at position B of Definition 1 below is 0.1%, preferably 1%, and more preferably 2% greater than the weight average molecular weight (Mw) of the polymer collected at position A.

(6) In the molded pipe, a content of the polymer having the weight average molecular weight (Mw) of 10,000 or less in the polymer taken at position A of Definition 1 below is 0.1%, preferably 1%, and more preferably 2% greater than the content of the polymer having a weight average molecular weight (Mw) of 10,000 or less in the polymer taken at position B.

(7) In the molded pipe, the content of the polymer having the weight average molecular weight (Mw) of 1,000,000 or greater in the polymer taken at position B of Definition 1 below is 0.1%, preferably 1%, and more preferably 2% greater than the content of the polymer having a weight average molecular weight (Mw) of 1,000,000 or more in the polymer taken at position A.

(8) In the molded pipe, the Z average molecular weight (Mz), measured by gel permeation chromatography (GPC), of the polymer taken at position B of Definition 1 below is 0.1%, preferably 1% greater than the Z average molecular weight (Mz) of the polymer taken at position A. The Z average molecular weight is 100,000 to 10,000,000, and preferably 200,000 to 5,000,000, and more preferably 500,000 to 3,000,000.

(9) In the molded pipe, the Z+1 average molecular weight (Mz+1), measured by gel permeation chromatography (GPC), of the polymer taken at position B of Definition 1 below is 1%, preferably 5% greater than the Z+1 average molecular weight (Mz+1) of the polymer taken at position A. The Z+1 average molecular weight is 1,000,000 to 10,000,000, and preferably 500,000 to 5,000,000, and more preferably 1,000,000 to 3,000,000.

[Definition 1]

In a molded pipe having an SDR (SDR (Standard Dimension Ratio)=od/en) value of 2 to 20, $$\text{position } A = \frac{id}{2} + (en \times 0.4) - \frac{id}{2} + (en \times 0.6) \text{ From pipe center}$$

$$\text{position } B = \frac{id}{2} + (en \times 0.8) - \frac{id}{2} + (en \times 1.0) \text{ From pipe center}$$

wherein id means an inner diameter, od means an outside diameter, and en means a wall thickness.

In order to prevent deformation of the outer surface at high stress during pipe processing, the weight average molecular weight (Mw) of the polymer located on the outer surface of the finished pipe is more than 150,000 at least, preferably more than 200,000. In rheology analysis, the ratio of the energy storage modulus (G') at a shear rate of 100 rad/s and 0.1 rad/s should be 200 or less, more preferably 150 or less. Thereby, if the molecular weight of the polyolefin resin is out of the above-mentioned range, the moldability of the polyolefin resin is lowered and the physical properties of the molded article may be deteriorated.

In the polyolefin resin according to the present invention, the melt flow index ratio (SR: high load melt flow index/melt flow index) is of 10 to 300, preferably 10 to 100, more preferably 20 to 50, the melt tension measured at 230° C. is of 3.0 to 10, preferably 4 to 8 gf, and the melt strength measured at 230° C. is of 1 cN or greater, preferably 2 to 10, more preferably 3 to 8 cN, and the relaxation time is of 400 seconds or less, preferably 0.1 to 200 seconds.

Also, the modulus ratio index (MRI) is of 20 to 200, preferably 50 to 180, and the long chain branch/1,000 C is 1/1,000 C or less, preferably 0.05 to 0.5/1,000 C or less, and a shear thinning index (STI) is of 20 to 100, preferably 20 to 80, and more preferably 20 to 50. If the conditions of the polyolefin resin according to the present invention are out of the above ranges, there may be problems such as sagging or surface roughness of the pipe when the pipe is formed.

As the olefin monomer for forming the polyolefin resin according to the present invention, linear aliphatic olefins having 2 to 12 carbon atoms, preferably 2 to 10 carbon atoms, cyclic olefins having 3 to 24 carbon atoms, preferably 3 to 18 carbon atoms, dienes, trienes, styrenes, and the like can be used. Examples of the linear aliphatic olefin include ethylene, propylene, butene-1, pentene-1, 3-methylbutene-1, hexene-1, 4-methylpentene-1, 3-methylpentene-1, heptene-1, octene-1, decene-1, 4,4-dimethyl-1-pentene, 4,4-diethyl-1-hexene, 3,4-dimethyl-1-hexene and the mixture thereof. Examples of the cyclic olefin include cyclopentene, cyclobutene, cyclohexene, 3-methylcyclohexene, cyclooctene, tetracyclodecene, octacyclodecene, dicyclopentadiene, norbornene, 5-methyl-2-norbornene, 5-ethyl-2-norbornene, 5-isobutyl-2-norbornene, 5,6-dimethyl-2-norbornene, 5,5,6-trimethyl-2-norbornene, ethylene norbornene and mixture thereof. As the examples of the dienes and trienes, a polyene having 4 to 26 carbon atoms and having two or three double bonds is preferable, and specifically 1,3-butadiene, 1,4-pentadiene, 1,4-hexadiene, 1,5-hexadiene, 1,9-decadiene, 2-methyl-1,3-butadiene and mixture thereof can be exemplified. Examples of the styrene include styrene or styrene substituted with an alkyl group having 1 to 10 carbon atoms, an alkoxy group having 1 to 10 carbon atoms, a halogen group, an amine group, a silyl group, a halogenated alkyl group and the mixture thereof. The olefin monomers may be homopolymerized or alternating, random, or block copolymerized.

Preferably the polyolefin resin according to the present invention is a homopolymer or a copolymer of an olefin monomer selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidene norbornene, phenyl norbornene, vinyl norbornene, dicyclopentadiene, 1,4-butadiene, 1,5-butadiene, 1,5-pentadiene, 1,6-hexadiene, styrene, α-methylstyrene, divinylbenzene, 3-chloromethylstyrene and mixture thereof. Further, in the polyolefin resin according to the present invention, it is preferable that the main component is selected from the group consisting of ethylene, propylene, and mixtures thereof and as the remaining auxiliary component, 0.01 to 3.0% by weight of constituent unit derived from α-olefin having 4 to 10 carbon atoms, for example 6 to 8 carbon atoms, is contained. Here, the content of the comonomer (α-olefin) can be measured by 13C-NMR.

The polyolefin resin according to the present invention can be used not only for the production of various molded articles such as blow molded articles, inflated molded articles, cast molded articles, extruded laminated molded articles, extrusion molded articles such as pipe or mold release, foamed molded articles, injection molded articles, sheets, films etc., but also for the production of fibers, monofilaments, nonwoven fabrics and the like. Particularly, the polyolefin resin of the present invention is useful for producing a blow molded article, an extrusion molded article such as a pipe or its variant, or a film-formed article.

The polyolefin resin according to the present invention can be crosslinked in the molding process. The molded product can be a molded composite (laminate) whose one part is made of the polyolefin according to the present invention and whose another part is made of different resin. Conventional additives, modifiers and the like can be further included in order to improve physical properties of the molded articles.

In the case of molding a pipe using the polyolefin resin according to the present invention, it is preferable that the molded pipe further satisfies the following conditions (10) and (11).

(10) In a pipe water pressure test, which measures the time at which a pipe is broken by applying a stress corresponding to a pressure of 5.4 MPa with water at 80° C. in accordance with KS M 3408, the pipe breaking time exceeds 165, preferably 200 hours.

(11) In a pipe water pressure test, which measures the time at which a pipe is broken by applying a stress corresponding to a pressure of 12.4 Mpa is applied with water at 20° C. in accordance with KS M 3408, the pipe breaking time exceeds 100, preferably 200 hours.

In the polyolefin resin according to the present invention, the molecular weight of the polymer located at the outer surface of the finished molded article (for example, a pipe) is higher than the molecular weight of the polymer located at the central portion of the molded article, so that the outer surface of the molded article is excellent. The polyolefin resin according to the present invention comprises a polymer which is relatively high relative to low molecular weight polymers and is relatively low relative to high molecular weight polymers. Therefore, when the polyolefin resin is molded, the chain transfer phenomenon caused by the difference in friction energy depending on the position is alleviated, and the outer surface of the molded article can be excellently manufactured. That is, in the chain transfer phenomenon, the medium-length chain serves to prevent the polymer having a long chain from migrating to the inside (center).

The polyolefin resin according to the present invention can be prepared by appropriately combining the respective components of the catalyst composition. The catalyst composition include at least one first organo-transition metal compound represented by the following formula 1, which is a catalyst system for expressing a relatively low molecular weight polymer, at least one second organo-transition metal compound represented by the following formula 2, which is a catalyst system for expressing a polymer having a relatively low molecular weight, at least one third organo-transition metal compound represented by the following formula 3, which is a catalyst system for expressing a relatively high molecular weight polymer, and aluminoxane.

$(L^1)(L^2)(X^1)(X^2)M^1$ [Formula 1]

$(L^3\text{-}Q^1_n\text{-}L^4)(X^3)(X^4)M^2$ [Formula 2]

$(L^5\text{-}Q^2_n\text{-}L^6)(X^5)(X^6)M^3$ [Formula 3]

In Formulas 1, 2 and 3, $M^1$, $M^2$ and $M^3$ each is independently titanium (Ti), zirconium (Zr), or hafnium (Hf), $L^1$, $L^2$, $L^3$, $L^4$, $L^5$ and $L^6$ each is independently a cyclic hydrocarbyl group having 5 to 30 carbon atoms and having at least two conjugated double bonds, and $X^1$, $X^2$, $X^3$, $X^4$, $X^5$ and $X^6$ each is independently a halogen atom or a hydrocarbyl group. Also, $Q^1$ and $Q^2$ each is independently a silane group or a hydrocarbyl group having a substituent, and n is an integer of 1 to 5.

First, the organo-transition metal compound represented by Formula 1 will be described in detail. $M^1$ in the formula 1 is titanium (Ti), zirconium (Zr), or hafnium (Hf). $L^1$ and $L^2$ each is independently a substituted or unsubstituted cyclic hydrocarbyl group having 5 to 30 carbon atoms and having at least two conjugated double bonds, wherein the conjugated double bond is preferably 2 to 6, more preferably 2 to 5, and the number of carbon atoms of the cyclic hydrocarbyl group is preferably 5 to 15, more preferably 5 to 13. Examples of L and $L^2$ include a cyclopentadienyl group, a substituted cyclopentadienyl group, an indenyl group, a substituted indenyl group, a fluorenyl group, a substituted fluorenyl group, a pentalene group, a substituted pentalene group and so on. The $L^1$ and $L^2$ may be partially substituted with 1 to 6 substituents, and the substituent may be hydrogen, an alkyl group having 1 to 20 carbon atoms, an alkenyl group having 1 to 20 carbon atoms, a cycloalkyl group having 3 to 20 carbon atoms, an aryl group having 4 to 20 carbon atoms, an alkylaryl group having 6 to 20 carbon atoms, a substituted or unsubstituted cyclopentadienyl group having 5 to 20 carbon atoms, a haloalkyl group having 1 to 20 carbon atoms, an alkoxy group having 1 to 20 carbon atoms, a haloaryl group having 6 to 20 carbon atoms, and a mixture thereof. The $X^1$ and $X^2$ each is an independently halogen atom or hydrocarbyl group, the halogen atom includes chlorine (Cl), fluorine (F), bromine (Br) and iodine (I), and the hydrocarbyl group is an alkyl group, a cycloalkyl group or an aryl group having 1 to 24 carbon atoms, preferably 1 to 12 carbon atoms, specifically an alkyl group such as methyl, ethyl, propyl, butyl or isobutyl, a cycloalkyl group such as cyclopentyl or cyclohexyl, or an aryl group such as phenyl.

Non-limiting examples of the first organo-transition metal compound represented by the above formula 1 include bis(cyclopentadienyl) zirconium difluoride, bis(methylcyclopentadienyl) zirconium difluoride, bis(n-propylcyclopentadienyl) zirconium difluoride, bis(n-butylcyclopentadienyl) zirconium difluoride, bis(cyclopentylcyclopentadienyl) zirconium difluoride, bis(cyclohexylcyclopentadienyl) zirconium difluoride, bis(1,3-dimethylcyclopentadienyl) zirconium difluoride, bis(isobutylcyclopentadienyl) zirconium difluoride, bis(indenyl) zirconium difluoride, bis(fluorenyl) zirconium difluoride, bis(4,5,6,7-tetrahydro-1-indenyl) zirconium difluoride, bis(cyclopentadienyl) zirconium difluoride, bis(methylcyclopentadienyl) zirconium difluoride, bis(n-propylcyclopentadienyl) zirconium difluoride, bis(n-butylcyclopentadienyl) zirconium difluoride, bis(cyclopentylcyclopentadienyl) zirconium dichloride, bis(cyclohexylcyclopentadienyl) zirconium difluoride, bis(1,3-dimethylcyclopentadienyl) zirconium dichloride, bis(isobutylcyclopentadienyl) zirconium dichloride, bis(indenyl) zirconium dichloride, bis(fluorenyl) zirconium dichloride, bis(4,5,6,7-tetrahydro-1-indenyl) zirconium dichloride, bis(cyclopentadienyl) zirconium dibromide, bis(methylcyclopentadienyl) zirconium dibromide, bis(n-propylcyclopentadienyl) zirconium dibromide, bis(n-butylcyclopentadienyl) zirconium dibromide, bis(cyclopentylcyclopentadienyl) zirconium dibromide, bis(cyclohexylcyclopentadienyl) zirconium dibromide, bis(1,3-dimethylcyclopentadienyl) zirconium dibromide, bis(isobutyl cyclopentadienly) zirconium dibromide, bis(indenyl) zirconium dibromide, bis(fluorenyl) zirconium dibromide, bis(4,5,6,7-tetrahydro-1-indenyl) zirconium dibromide, cyclopentadienyl zirconium trifluoride, cyclopentadienyl zirconium trichloride, cyclopentadienyl zirconium tribromide, cyclopentadienyl zirconium triiodide, methylcyclopentadienyl zirconium trifluoride, methylcyclopentadienyl zirconium trichloride, methylcyclopentadienyl zirconium tribromide, methylcyclopentadienyl zirconium triiodide, butylcyclopentadienyl zirconium trifluoride, butylcyclopentadienyl zirconium trichloride, butylcyclopentadienyl zirconium tribromide, butylcyclopentadienyl zirconium triiodide, pentamethylcyclopentadienyl zirconium trifluoride, pentamethylcyclopentadienyl zirconium trichloride, pentamethylcyclopentadienyl zirconium tribromide, pentamethylcyclopentadienyl zirconium triiodide, indenyl zirconium trifluoride, indenyl zirconium trichloride, indenyl zirconium tribromide, indenyl zirconium triiodide, 4,5,6,7-tetrahydro indenyl zirconium trifluoride, 4,5,6,7-tetrahydro indenyl zirconium trichloride, 4,5,6,7-tetrahydro indenyl zirconium tribromide, 4,5,6,7-tetrahydro indenyl zirconium triiodide, methylindenyl zirconium trifluoride, methylindenyl zirconium trichloride, methylindenyl zirconium tribromide, methylindenyl zirconium triiodide, phenylindenyl zirconium trifluoride, phenylindenyl zirconium trichloride, phenylindenyl zirconium tribromide, phenylindenyl zirconium triiodide, fluorenyl zirconium trifluoride, fluorenyl zirconium trichloride, fluorenyl zirconium tribromide, fluorenyl zirconium triiodide and so on.

Next, the second and third organo-transition metal compounds represented by Formulas 2 and 3 will be described. $M^2$ and $M^3$ each in Formulas 2 and 3 is independently the same as the definition of $M^1$ in Formula 1, and $L^3$, $L^4$, $L^5$ and $L^6$ each is independently the same as the definitions of $L^1$ and $L^2$. $X^3$, $X^4$, $X^5$ and $X^6$ each is independently the same as the definitions of $X^1$ and $X^2$. $Q^1$ and $Q^2$ each connects $L^3$ with $L^4$ and $L^5$ with $L^6$, and independently a silane group and a hydrocarbyl group, preferably an alkenyl group having 1 to 20 carbon atoms, an alkylsilane group having 1 to 20 carbon atoms, an arylsilyl group having 6 to 20 carbon atoms, an arylalkenyl group having 6 to 20 carbon atoms, an alkane having 1 to 20 carbon atoms and mixture thereof, and specific examples thereof include alkenyl groups such as methylidene, ethylene and isopropylidene, alkylsilane groups such as dimethylsilane, arylsilane groups such as diphenylsilane, arylalkenyl groups such as diphenylmethylidene, an arylsilyl group such as diphenylsilyl, an alkane such as ethane and so on.

The second organo-transition metal compound represented by Formula 2 is a catalyst component capable of forming a polymer having a relatively medium molecular weight (for example, a weight average molecular weight of 50,000 to 200,000), and the third organo-transition metal compound represented by Formula 3 is also a catalyst component capable of forming a polymer having a relatively high molecular weight (for example, a weight average molecular weight of 200,000 to 1,000,000). Both compounds can stably express polymerization even at a high temperature (about 80° C. or higher) and has superior comonomer insertion ability to the catalyst component (first organo-transition metal compound) that expresses the low molecular weight polymer. The second and the third organo-transition metal compounds include rigidly-bridged ansa-metallocenes in which one or two aryl groups, specifically one or two phenyl groups are bonded to a bridging atom linking ligands, but not limited by the above.

Non-limiting examples of the second organo-transition metal compound of Formula 2 and the third organo-transition metal compound of Formula 3 include rac-ethylene bis(1-indenyl) zirconium dichloride, rac-ethylene bis(1-tetrahydro-indenyl) zirconium dichloride, rac-dimethylsilanediylbis (2-methyl-tetrahydrobenzindenyl) zirconium dichloride, rac-dimethylsilanediylbis (2-methyl-4,5-tetrahydrobenzindenyl) zirconium dichloride, rac-diphenylsilanediylbis(2-methyl-5,6-cyclopentadienylindenyl) zirconium dichloride, rac-dimethylsilylbis(2-methyl-4-phenylindenyl) zirconium dichloride, rac-diphenyl silylbis (2-methyl-4-phenylindenyl) zirconium dichloride, iso-propylidene (cyclopentadienyl) (9-fluorenyl) zirconium dichloride, diphenylsilyl (cyclopentadienyl) (9-fluorenyl) zirconium dichloride, diphenylmethylidene (cyclopentadienyl) (2,7-di-tert-butylfluoren-9-yl) zirconium dichloride, diphenylmethylidene (3-tert-butylcyclopentadienyl) (2,7-di-tert-butylfluoren-9-yl) zirconium dichloride, diphenylmethylidene (3-tert-butyl-5-methylcyclopentadienyl) (2,7-di-tert-butylfluoren-9-yl) zirconium dichloride, 1,2-ethylenebis (9-fluorenyl) zirconium dichloride, rac-[1,2-bis (9-fluorenyl)-1-phenyl-ethane] zirconium dichloride, iso-propylidene (2-phenyl-cyclopentadienyl) (9-fluorenyl) zirconium dichloride, diphenylmethylidene (2-phenyl-cyclopentadienyl) (9-fluorenyl) zirconium dichloride, iso-propylidene(2-phenyl-cyclopentadienyl) (2,7-di-tert-butylfluoren-9-yl) zirconium dichloride, diphenylmethylidene (2-phenyl-cyclopentadienyl) (2,7-di-tert-butylfluoren-9-yl) zirconium dichloride, [(4-(fluorenyl)-4,6,6-trimethyl-2-(p-tolyl)-tetrahydropentrene] zirconium dichloride, [(isopropylidene-(2-(p-tolyl)-cyclopentadienyl)-(9-fluorenyl)] zirconium dichloride, isopropylidene (2-(m-tolyl)-cyclopentadienyl)-(9-fluorenyl)] zirconium dichloride, [diphenylmethylidene (2-(m-tolyl)-cyclopentadienyl)-(9-fluorenyl)] zirconium dichloride, isopropylidene (2-(m-tolyl)-cyclopentadienyl)(2,7-di-tert-butylfluoren-9-yl)] zirconium dichloride, [diphenylmethylidene(2-(m-tolyl)-cyclopentadienyl) (2,7-di-tert-butylfluoren-9-yl)] zirconium dichloride, [isopropylidene (2-(o-tolyl)-cyclopentadienyl) (9-fluorenyl)] zirconium dichloride, [4-(fluorenyl)-4,6,6-trimethyl-2-(2,4-dimethylphenyl)-tetrahydropentalene] zirconium dichloride, [isopropylidene (2-(2,3-dimethylphenyl)-cyclopentadienyl) (9-fluorenyl)] zirconium dichloride, [isopropylidene (2-(2, 4-dimethylphenyl)-cyclopentadienyl) (9-fluorenyl)] zirconium dichloride, [diphenylmethylidene (2-(2,3-dimethylphenyl)-cyclopentadienyl) (9-fluorenyl)] zirconium dichloride, [diphenylmethylidene (2-(2,4-dimethylphenyl)-cyclopentadienyl) (9-fluorenyl)] zirconium dichloride, [iso-propylidene(2-(2,3-dimethylphenyl)-cyclopentadienyl)(2,7-di-tert-butylfluoren-9-yl)] zirconium dichloride, [isopropylidene(2-(2,4-dimethylphenyl)-cyclopentadienyl) (2,7-di-tert-butylfluoren-9-yl)] zirconium dichloride, [diphenylmethylidene(2-(2,3-dimethylphenyl)-cyclopentadienyl)(2,7-di-tert-butylfluoren-9-yl)] zirconium dichloride, [diphenylmethylidene (2-(2,4-dimethylphenyl)-cyclopentadienyl)(2,7-di-tert-butylfluoren-9-yl)] zirconium dichloride, [4-(fluorenyl)-4,6,6-trimethyl-2-(difluorophenyl)-tetrahydropentalene] hafnium dichloride, isopropylidene(2-tetramethylphenyl-cyclopentadienyl)(9-fluorenyl) zirconium dichloride, isopropylidene(2-(2,6-dimethylphenyl)-cyclopentadienyl)(9-fluorenyl) zirconium dichloride, isopropylidene(2-(3,5-dimethylphenyl)-cyclopentadienyl)(9-fluorenyl) zirconium dichloride, isopropylidene(2-(2,3-dimethoxyphenyl)-cyclopentadienyl)(9-fluorenyl) zirconium dichloride, isopropylidene(2-(chlorophenyl)-cyclopentadienyl)(9-fluorenyl) zirconium dichloride, isopropylidene(2-(pentafluorophenyl)-cyclopentadienyl)(9-fluorenyl) zirconium dichloride, isopropylidene(2-(tert-butylphenyl)-cyclopentadienyl)(9-fluorenyl) zirconium dichloride, isopropylidene(2-(biphenyl)-cyclopentadienyl) (9-fluorenyl) zirconium dichloride, isopropylidene(2-(3,5-diphenyl-phenyl)-cyclopentadienyl)(9-fluorenyl) zirconium dichloride, isopropylidene(2-naphthyl-cyclopentadienyl)(9-fluorenyl) zirconium dichloride, diphenylmethylidene(2-tetramethylphenyl-cyclopentadienyl)(9-fluorenyl) zirconium dichloride, diphenylmethylidene(2-(2,6-dimethylphenyl)-cyclopentadienyl)(9-fluorenyl) zirconium dichloride, diphenylmethylidene(2-(2,4-dimethoxyphenyl)-cyclopentadienyl) (9-fluorenyl) zirconium dichloride, diphenylmethylidene(2-(chlorophenyl)-cyclopentadienyl) (9-fluorenyl) zirconium dichloride, diphenylmethylidene(2-(fluorophenyl)-cyclopentadienyl)(9-fluorenyl) zirconium dichloride, diphenylmethylidene(2-(pentafluorophenyl)-cyclopentadienyl)(9-fluorenyl) zirconium dichloride, diphenylmethylidene(2-(tert-butylphenyl)-cyclopentadienyl)(9-fluorenyl) zirconium dichloride, diphenylmethylidene(2-(3,5-di-tert-butylphenyl)-cyclopentadienyl)(9-fluorenyl) zirconium dichloride, diphenylmethylidene(2-(biphenyl)-cyclopentadienyl)(9-fluorenyl) zirconium dichloride, diphenylmethylidene(2-naphthyl-cyclopentadienyl)(9-fluorenyl) zirconium dichloride and so on. The second and third organo-transition metal compounds may be used independently or in combination of two or more of the above compounds.

The aluminoxane serves as an activator and for removing impurities. For example, aluminoxane represented by the following formula 4 can be used, and may have a linear, cyclic or network structure. The linear aluminoxane may be represented by the following formula 5, and the cyclic aluminoxane may be represented by the following formula 6.

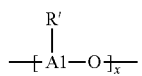

[Formula 4]

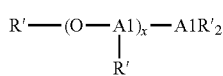

[Formula 5]

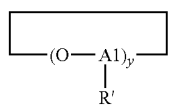

[Formula 6]

In Formulas 4, 5 and 6, R' is a hydrocarbyl group, preferably a linear or branched alkyl group having 1 to 10 carbon atoms, and most preferably R' is a methyl group, x is an integer of 1 to 70, preferably an integer of 1 to 50, more preferably an integer of 10 to 40, and y is an integer of 3 to 50, preferably an integer of 10 to 40.

In the present invention, commercially available alkyl aluminoxanes can be used. Non-limiting examples of the alkyl aluminoxane include methylaluminoxane, ethylaluminoxane, butylaluminoxane, isobutylaluminoxane, hexylaluminoxane, octylaluminoxane, decylaluminoxane, and the like. The aluminoxane is commercially available in the form of various types of hydrocarbon solutions. Among them, aluminoxane of aromatic hydrocarbon solution is preferably used, and aluminoxane solution dissolved in toluene is more preferably used. The aluminoxane used in the present invention can be used alone or in combination of two or more. The alkylaluminoxane may be prepared in a conventional manner by adding an appropriate amount of water to the trialkylaluminum or by reacting a hydrocarbon compound or an inorganic hydrate containing water with trialkylaluminum. Generally, a mixture of linear and cyclic aluminoxane is obtained.

In the catalyst for olefin polymerization used in the present invention, with respect 1 mole of the first organo-transition metal compound represented by Formula 1, the amount of the second organo-transition metal compound represented by Formula 2 is preferably 0.01 to 100 moles, preferably 0.1 to 20 moles, more preferably 0.5 to 10 moles, the amount of the third organo-transition metal compound represented by Formula 3 is preferably 0.01 to 100 moles, preferably 0.1 to 20 moles, more preferably 0.5 to 10 moles. If the amount of the first organo-transition metal compound represented by the formula 1 is too small, a polymer having a high molecular weight may be predominantly produced. If the amount of the first organo-transition metal compound is too high, a polymer having a low molecular weight may be predominantly produced.

The amount of aluminoxane is used such that the amount of aluminum in aluminoxane is 1 to 100,000 moles, preferably 1 to 5,000 moles, more preferably 1 to 2,500 moles, with respect to 1 mole of sum of the first organo-transition metal compound represented by the formula 1, the second organo-transition metal compound represented by the formula 2, the third organo-transition metal compound represented by the formula 3. For example, the first, second and third organo-transition metal compounds and aluminoxane are mixed so that 1 to 100,000 moles, preferably 1 to 5,000 moles, of aluminum is used per mole of the total organo-metallic compounds of transition metals, then the catalyst for olefin polymerization of the present invention is produced.

The catalyst components can be mixed without specific limitations. For example, the organometallic compounds, the first, the second and the third organo-transition metal compounds and aluminoxane are mixed simultaneously for 5 minutes to 24 hours, preferably 15 minutes to 16 hours. Alternatively, the organometallic compound and the aluminoxane are first mixed for 5 minutes to 10 hours, preferably for 15 minutes to 4 hours, and the mixture is added to a mixture of the first organo-transition metal compound and the aluminoxane for 5 minutes to 24 hours, preferably 15 minutes to 16 hours. The second organo-transition metal compounds and the aluminoxane are mixed for 5 minutes to 10 hours, preferably for 15 minutes to 4 hours. Then the latter mixture is mixed with the former mixture for 5 minutes to 24 hours, preferably for 15 minutes to 16 hours. It is desirable that the compounds should be mixed under an inert atmosphere of nitrogen or argon, without a solvent, or in the presence of an inert hydrocarbon solvent such as heptane, hexane, benzene, toluene, xylene and so on. The temperature of the mixing process is 0 to 150° C., preferably 10 to 100° C. The catalyst solution in which the catalyst is uniformly dissolved in the hydrocarbon solvent can be used as it stands, or the catalyst in a solid powder state after the solvent has been removed can be used. The catalyst in a solid powder state can be prepared by carrying out a precipitation reaction of the catalyst solution and solidifying the precipitate from the reaction.

The olefin polymerization catalyst composition according to the present invention may further comprise an organic or inorganic carrier which supports mixture of the organometallic compound, the first to third organo-transition metal compounds, and the aluminoxane. Therefore, the catalyst composition of the present invention can exist in a form supported by an organic or inorganic carrier or a form of an insoluble particle of the carrier (silica, alumina, silica-alumina mixture, etc.), as well as a form of a solid powder or a homogeneous solution. The method for contacting the catalyst composition of the present invention with the carrier will be explained, but the present invention is not limited to the following methods. At first, a solution state catalyst which is prepared by mixing the organometallic compound, the first to third organo-transition metal compounds and the aluminoxane, is contacted with a porous carrier (for example, a silica carrier having pore sizes of 50 to 500 Å and a pore volume of 0.1 to 5.0 cm$^3$/g) to form a slurry. Next, the catalyst of the slurry state is treated with an acoustic wave or oscillating wave having the frequency of 1 to 10.000 kHz, preferably 20 to 500 kHz at 0° C. to 120° C., preferably 0° C. to 80° C. for 0.1 to 6 hours, preferably 0.5 to 3 hours, to uniformly deeply infiltrate the catalyst components into the pores of the carrier. And then, the catalyst slurry is dried under vacuum or nitrogen flow to form a catalyst of a solid powder state. The acoustic wave or oscillating wave is preferably ultrasonic waves. The step of supporting the catalyst on a carrier may also include the step of washing the supported catalyst with a hydrocarbon selected from the group consisting of pentane, hexane, heptane, isoparaffin, toluene, xylene and mixtures thereof, after applying the acoustic wave or the oscillating wave to the catalyst.

As the porous carrier, porous inorganic compounds, inorganic salts, and organic compounds with micro pores and a large surface area can be used without restrictions. The shape of the inorganic carrier is not limited if the shape can be maintained during the preparation process of the supported catalysts, and may be in any shape such as powder, particle, flake, foil, fiber, and so on. Regardless of the shape of the inorganic carrier, the maximum length of the inorganic carrier is generally from 5 to 200 µm, preferably from 10 to 100 µm, the preferable surface area of the inorganic carrier is 50 to 1,000 m$^2$/g and the preferable pore volume is 0.05 to 5 cm$^3$/g. Generally, the inorganic carrier should be treated to remove water or hydroxyl group therefrom before the use. The treatment can be carried out by calcining the carrier at 200° C. to 900° C. under an inert atmosphere such as air, nitrogen, argon, or so on. Non-limiting examples of the inorganic salt carrier or the inorganic carrier include silica, alumina, bauxite, zeolite, magnesium chloride ($MgCl_2$), calcium chloride ($CaCl_2$), magnesium oxide (MgO), zirconium dioxide ($ZrO_2$), titanium dioxide ($TiO_2$), boron trioxide ($B_2O_3$), calcium oxide (CaO), zinc oxide (ZnO), barium oxide (BaO), thorium oxide ($ThO_2$) and mixtures thereof such as silica-magnesium oxide ($SiO_2$—MgO), silica-alumina ($SiO_2$—$Al_2O_3$), silica-titanium dioxide ($SiO_2$—$TiO_2$), silica-vanadium pentoxide ($SiO_2$—$V_2O_5$), silica-chromium trioxide ($SiO_2$—$CrO_3$), silica-titanium dioxide-magnesium oxide ($SiO_2$—$TiO_2$—MgO) or so on. Small amount of carbonate, sulfate, or nitrate can be added to these compounds. Non-limiting examples of the organic carrier include starch, cyclodextrin, synthetic polymer or so on. Examples of the solvent, which is used for bringing the catalyst of the present invention into contact with the carrier, include an aliphatic hydrocarbon solvent such as pentane, hexane, heptane, octane, nonane, decane, undecane, dodecane and so on, an aromatic hydrocarbon solvent such as benzene, monochlorobenzene, dichlorobenzene, trichlorobenzene, toluene and so on, a halogenated aliphatic hydrocarbon solvent such as dichloromethane, trichloromethane, dichloroethane, trichloroethane, and so on. When the olefin polymerization catalyst composition according to the present invention is supported in the carrier, each components of the olefin polymerization catalyst composition is the same in the solution or solid state. The carrier amount of aluminum in the olefin polymerization catalyst composition is 5 to 30 weight part, preferably 7 to 20 weight part with respect to 100 weight part of the carrier, and the carrier amount of the transition metal compound in the olefin polymerization catalyst composition is 0.01 to 2 weight part, preferably 0.05 to 1.5 weight part with respect to 100 weight part of the carrier.

Next, the present olefin polymerization process will be described. The olefin polymerization catalyst composition of the present invention can exist in a form supported by an inorganic or organic carrier or a form of an insoluble particle of the carrier, as well as a form of a homogeneous solution. Thus, the olefin polymerization catalyst composition can be used for a solution phase, a slurry phase, a bulk phase or a gas phase polymerization reaction. The conditions for the polymerization reactions can be varied according to the state of the catalyst (homogeneous or heterogeneous phase (supported phase)), the polymerization method (solution polymerization, slurry polymerization, gas phase polymerization), target polymer properties or the polymer shape. When the polymerization is carried out in a solution phase or a slurry phase, a solvent or olefin itself may work as a reaction medium. Examples of the solvent include propane, butane, pentane, hexane, octane, decane, dodecane, cyclopentane, methylcyclopentane, cyclohexane, benzene, toluene, xylene, dichloromethane, chloroethane, 1,2-dichloroethane, chlorobenzene, and so on, and, if necessary, mixtures of the solvents can be used. In the polymerization or copolymerization of olefin according to the present invention, the amount of the first to third organo-transition metal compounds used is not limited especially. However, the concentration of the central metal of the first to third organo-transition metal compounds is preferably $10^{-8}$ to 10 mol/l, and more preferably $10^{-7}$ to $10^{-2}$ mol/l in a polymerization reaction system.

In the olefin polymerization or copolymerization of the present invention, the polymerization temperature is generally 70 to 110° C., which is not especially limited because it can be varied according to reactants, reaction conditions, and so on. However, the polymerization temperature is generally 0 to 250° C., and more preferably 10 to 200° C. in a solution polymerization, and generally 0 to 120° C., and more preferably 20 to 110° C. in a slurry or a gas phase polymerization. The polymerization pressure is generally atmospheric pressure to 500 kgf/cm$^2$, preferably atmospheric pressure to 60 kgf/cm$^2$, more preferably 10 to 60 kgf/cm$^2$. The polymerization reaction can be carried out in a batch type, a semi-continuous type, or a continuous type reaction. The polymerization can be carried out by two or more steps of different reaction conditions. The molecular weight and molecular weight distribution of the resulting polymer can be controlled by changing the polymerization temperature, or by injecting hydrogen into a reactor. The polyolefin resin polymerization of the present invention can be carried out by using a conventional single loop reactor, gas phase reactor, ICFB (internally circulating fluidized-bed) reactor (Referring to Korean Patent Nos. 10-981612, 10-999543 and 10-999551 etc.).

The olefin polymerization catalyst composition of the present invention can be used not only in a main polymerization of olefin monomers but also in a prepolymerization of olefin monomers. In the prepolymerization process, the olefin polymer or copolymer is produced in the amount of 0.05 to 500 g, preferably 0.1 to 300 g, and more preferably 0.2 to 100 g with respect to 1 g of the catalyst. Examples of the olefin suitable for the prepolymerization, include α-olefin of 2 to 20 carbon atoms, such as ethylene, propylene, 1-butene, 1-pentene, 4-methyl-1-pentene, 1-hexene, 1-octene, 1-decene, 1-dodecene, 1-tetradecene, 3-methyl-1-butene, 3-methyl-1-pentene, and so on. And it is preferable that olefin for the prepolymerization is the same one for the main polymerization.

Hereinafter, the preferable examples are provided for better understanding of the present invention. However, the present invention is not limited to the following examples. In the following examples, the olefin polymerization catalyst was produced with Schlenk method in which air and moisture were completely blocked and purified and dried nitrogen was used as an inert gas. Solvent was dried with sodium metal under inert nitrogen atmosphere. In the specification and the Examples, the measurement method of each property is as follows.

(1) Density: Measured according to ASTM 1505 and ASTM D 1928.

(2) Melt Flow Index (MIP, 5.0 kg/10 minutes): Measured according to ASTM D1238 at 190° C.

(3) High load Melt Flow Index (MIF, 21.6 kg/10 minutes): Measured according to ASTM D1238 at 190° C.

(4) Melt Flow Index ratio (SR): High load Melt Flow Index (MIF)/Melt Flow Index (MIP)

(5) GPC molecular weight and molecular weight distribution (Mw, Mz, Mz+1, MWD): Measured as follows by using Gel permeation chromatography (GPC, product 220, Polymer Laboratory Inc.). The separation column was composed of two Olexis and one Guard, and the column temperature was maintained at 160° C. Calibration was performed using a standard polystyrene set manufactured by Polymer Laboratory, and trichlorobenzene containing 0.0125% by weight of dibutyl hydroxyl toluene (BHT) as an antioxidant was used as the eluent. The sample was prepared at a ratio of 0.1 to 1 mg/ml, the injection amount was 0.2 ml, the injection time was 30 minutes, and the pump flow rate was 1.0 ml/minute for 30 to 60 minutes. Number average molecular weight (Mn), weight average molecular weight (Mw), and z average molecular weight (Mz) were measured in terms of polyethylene after universal calibration, using polystyrene standards Easical A and Easical B (Agilent Inc.). As a detector, a refractive index (RI) detector was used. The molecular weight distribution (Mw/Mn) represents the ratio of the weight average molecular weight to the number average molecular weight.

(6) Low Molecular Weight content (LMW %): Using the program (Origin Pro 8.6), only the low molecular weight content was extracted using the GPC data and the Gaussian law analyzed in (5) above to calculate the total amount.

(7) Cross-fractionation Chromatography (CFC): Cross-fractionation Chromatography (CFC, PolymerChar Inc.) was measured as follows. The separation column was composed of two Olexis and one Guard, and the column temperature was maintained at 150° C. Calibration was performed using a standard polystyrene set from Polymer Laboratory, trichlorobenzene was used as the eluent, the concentration of the sample was 70~80 mg/ml, the injection volume was 0.5 ml, and the pump flow rate was 1.0 ml/minute. After the injection of the sample, the temperature of the oven was raised to 40° C./minute and the temperature was raised to 150° C. After holding at 150° C. for 60 minutes, the temperature was lowered to 40° C./minute and the temperature of the sample was lowered to 95° C. Maintained at 95° C. for 45 minutes, lowered to 30° C. at 0.5° C./minute, and then kept for 30 minutes. Thereafter, the temperature of the sample was raised from 35° C. to 120° C., and the temperature-dependent fractions were divided into 22 fractions at intervals of 4° C., 0.5 ml of each sample was injected, and the eluted fractions were passed through a TREF column and an Olexis column to measure the TREF value and molecular weight. Next, the PE-converted molecular weight was calculated using a calibration curve using a standard polystyrene set. Data processing was performed using "CFC calibration", which is a device part analysis program. It took about 600 minutes to complete the analysis and an infrared spectrometer was used as the detector.

(8) Melt Tension: Measured as follows using Capirograph (Capirograph 1B, Toyoseiki Inc.). Using a capillary having a length of 10 mm and a diameter of 1.0 mm, 5 to 10 g of a pellet sample was measured under the conditions of a measurement temperature of 230° C., a velocity of 10 mm/minute, and a draw of 30 m/minute, and the average value was obtained by measuring three times per one sample.

(9) Tensile Strength at Yield: Measured according to ASTM D638. The test speed was 50 mm/minute, and the average value was obtained by measuring 5 times per one specimen.

(10) Elongation: Measured according to ASTM D638. The test speed was 50 mm/minute, and the average value was obtained by measuring 5 times per one specimen.

(11) Flexural modulus: Measured according to ASTM D790. The specimens were measured until 5% deformation, and the average value was obtained by measuring 5 times per one specimen.

(12) Izod impact: Measured according to ASTM D256. The width and thickness of the test piece were measured, a V-notch was formed, and the impact strength value was measured by applying a shock to the test piece. The average value was obtained by measuring 5 times per one specimen.

(13) Hydrostatic Pressure Test: Measured according to KS M ISO 1167. A pipe having an outer diameter of 34 mm and a thickness of 3.5 mm was placed in water at 20° C. and a circumferential stress corresponding to a pressure of 12.4 MPa was applied to the inside of the pipe to measure the time at which the pipe was broken. Also, a pipe having an outer diameter of 34 mm and a thickness of 3.5 mm was inserted and a circumferential stress corresponding to a pressure of 5.4 MPa was applied to the inside of the pipe to measure the time at which the pipe was broken.

(14) Pipe appearance: It was judged as good, normal or bad with naked eyes.

(15) Product formability evaluation: A pipe having an outer diameter of 34 mm and a thickness of 3.5 mm was extruded at an extrusion temperature (die temperature) of 200° C. using a pipe extruder (16 Die Dia., 41 Screw Dia., Wonil ENG.).

(15a) Resin melt pressure(bar): Under the above processing conditions, when the pipe was extruded, the resin melt pressure generated at the extruded portion was measured.

(15b) Extrusion amount (g/minute): Under the above processing conditions, when the film and the pipe were extruded, the weight of the resin extruded per minute was measured.

(16) Shear Thining Index (STI): Measured using the following formula 1. A Rhometrics Mechanical Spectrometer (RMS-800) instrument was used in a parallel plate manner and then STI was measured under at a diameter of 25 mm and a temperature of 190° C.

$$STI=\eta_{0.1}/\eta_{100} \quad \text{[Equation 1]}$$

where $\eta_{0.1}$ is a viscosity at a strain rate of 0.1 rad/s, and $\eta_{100}$ is a viscosity at a strain rate of 100 rad/s.

(17) Modulus Ratio Index (MRI): Was measured using the following formula 2. A Rhometrics Mechanical Spectrometer (RMS-800) instrument was used in a parallel plate manner and then MRI was measured at a diameter at a diameter of 25 mm and a temperature of 190° C.

$$MRI=G'_{100}G'_{0.1} \quad \text{[Equation 2]}$$

Where $G'_{0.1}$ is a storage modulus at a strain rate of 0.1 rad/s and $G'_{100}$ is a storage modulus at a strain rate of 100 rad/s.

(18) Long Chain Branch/1,000 C: Was measured using the following formula 3 (References: Macromolecules 1999, 32, 8454-8464).

$$LCBI=\eta_0^{0.196}/[\eta] \times 1/4.7-1 \quad \text{[Equation 3]}$$

Where $\eta_0$ is a zero shear viscosity at 190° C. and $[\eta]$ is a intrinsic viscosity at 150° C.

(19) Relaxation Time, s (Relaxation Time, $\tau_0$): Was measured using the following formula 4.

$$\eta=\eta_0/(1+(\gamma\tau_0)^n) \quad \text{[Equation 4]}$$

where n is a power law index of a material, $\eta$ is a measured complex viscosity, and $\gamma$ is a strain rate, $\tau_0$ is a shear rate (x-axis value in the RMS frequency sweep according to the Cox-Mertz rule).

[Preparation Example 1] Preparation of Catalyst

To a 150 L reactor under the nitrogen atmosphere were added bis(isobutylcyclopentadienyl)zirconium dichloride ((iBuCp)$_2$ZrCl$_2$) as a first organo-transition metal compound, diphenylmethylidene(normal butylcyclopentadienyl) (2,7-di-tert-butylfluoren-9-yl) Zirconium dichloride (Ph$_2$C (2,7-t-BuFlu)) (nBu-Cp) ZrCl$_2$) as a second organo-transition metal compound and methylaluminoxane (MAO, Albemarle Corp., 10% toluene solution) as aluminoxane and the resultant mixture was stirred at 60° C. for 60 minutes to prepare a solution. The solution was mixed with silica (SiO$_2$) which is heat-treated at 250° C., subjected to ultrasound for one hour and then the supernatant was removed. The remaining solid was washed with hexane twice and dried out in vacuum to obtain a supported catalyst in the form of a freely flowing solid powder.

[Preparation Example 2] Preparation of Catalyst

To a 150 L reactor under the nitrogen atmosphere were added bis(isobutylcyclopentadienyl)zirconium dichloride ((iBuCp)$_2$ZrCl$_2$) as a first organo-transition metal compound, ethylene(bisindenyl)zirconium dichloride (rac-Et (Ind)$_2$ZrCl$_2$) as a second organo-transition metal compound, diphenylmethylidene(normal butylcyclopentadienyl) (2,7-di-tert-butylfluoren-9-yl) zirconium dichloride (Ph$_2$C(2,7-t-BuFlu)) (nBu-Cp) ZrCl$_2$) as a third organo-transition metal compound and methylaluminoxane (MAO, Albemarle Corp., 10% toluene solution) as aluminoxane, The resultant mixture was stirred at 60° C. for 60 minutes to prepare a solution. The solution was mixed with silica (SiO$_2$) which is heat-treated at 250° C., subjected to ultrasound for one hour and then the supernatant was removed. The remaining solid was washed with hexane twice and dried out in vacuum to obtain a supported catalyst in the form of a freely flowing solid powder.

[Preparation Example 3] Molding of Pipes

A pipe having a nominal diameter of 50 mm, an outer diameter of 60 mm, a thickness of 5.5 mm and an approximate inner diameter of 49 mm was formed by using the polymers of Example 2 and Comparative Examples 1 and 4 through a pipe extruder.

[Examples 1 to 3, Comparative Example 1]
Ethylene/1-Hexene Copolymerization and
Evaluation of Physical Properties of Copolymer The copolymerization method was applied according to the polymerization method of the continuous single-loop process well known to those skilled in the art. The hybrid supported metallocene catalyst obtained in the Preparation Example 1 was continuously added at a rate of 1.5 g/h in the single-loop slurry polymerization process, and 1-hexene was used as a comonomer to prepare polyethylene. Specifically, the polymerization conditions of polyethylene were described in detail. First 53 L of a single loop reactor was charged with isobutane, and then ethylene, hexene-1 and the catalyst were continuously injected to continuously obtain polyethylene. Polymerization conditions were shown in Table 1 below.

TABLE 1

|  | Example 1 | Example 2 | Example 3 | Comparative Example 1 |
|---|---|---|---|---|
| Catalyst preparation method | Preparation Example 2 | Preparation Example 2 | Preparation Example 2 | Preparation Example 1 |
| Polymerization temp. (° C.) | 89 | 89 | 89 | 89 |
| Ethylene content (mol %) | 12 | 12 | 12 | 12 |
| 1-hexene content (wt %) | 1.2 | 1.2 | 1.2 | 1.2 |
| Hydrogen (mg/kgC2) | 200 | 150 | 100 | 200 |
| Catalytic activity (gPE/gCat-hr) | 3,500 | 3,400 | 3,200 | 3,500 |

[Comparative Example 2 to 4] Property Evaluation of Commercial Copolymers

Under the same conditions, the physical properties and moldability of three types of commercially available polyethylene products (Comparative Examples 2 to 4) were compared with those of the polyethylene of Examples 1 to 3 and Comparative Example 1. Comparative Example 2 is a product of 8,000 M high density polyethylene produced by Lotte Chemical Co., Ltd, Comparative Example 3 is a product of HIDEN P600 high density polyethylene produced by Korea Petrochemical Ind. Co., Ltd, and Comparative Example 4 is a product of Yuzex 6100 high density polyethylene produced by SK Chemical Co., Ltd. The raw materials of Comparative Examples 2 to 4, which are commercially available, were compared with the raw material properties of Examples 1 to 3 and Comparative Example 1, and the results are shown in Table 2 below. Sheet properties, pipe properties and extrusion moldability of polymers of Examples 1 to 3 and Comparative Example 1 and the polyethylene products of Comparative Examples 2 to 4 are shown in Tables 3, 4 and 5.

TABLE 2

| Div. | Item | Example 1 | Example 2 | Example 3 | Comparative Example 1 | Comparative Example 2 | Comparative Example 3 | Comparative Example 4 |
|---|---|---|---|---|---|---|---|---|
| Resin properties | MIP(5 Kg), g/10 min | 0.38 | 0.23 | 0.19 | 0.38 | 0.27 | 0.21 | 0.25 |
|  | SR (F/P) | 24.7 | 25.6 | 25.1 | 26.3 | 22.8 | 33.2 | 42.9 |
|  | Density, g/cm$^3$ | 0.9493 | 0.9486 | 0.9491 | 0.9499 | 0.9467 | 0.949 | 0.9483 |
|  | Molecular weight distribution | Bimodal | Bimodal | Bimodal | Bimodal | Bimodal | Bimodal | Bimodal |
|  | LMW (%) | 55.5 | 56.4 | 56.9 | 58.0 | — | 54.5 | 59.7 |
|  | Mw (g/mol) | 157,968 | 187,076 | 199,521 | 179,659 | 261,642 | 234,315 | 263,537 |
|  | Mz (g/mol) | 763,876 | 864,153 | 941,756 | 759,359 | 1,801,018 | 1,702,804 | 2,161,748 |
|  | Mw > 1,000,000 (%) | 4.0 | 5.5 | 6.6 | 6.4 | 9.6 | 9.0 | 10.6 |
|  | Mw > 5,000,000 (%) | 0.01 | 0.02 | 0.03 | 0.06 | 0.62 | 0.48 | 0.86 |
|  | MWD (Mw/Mn) | 13.92 | 11.90 | 13.52 | 15.16 | 16.98 | 22.63 | 25.03 |
|  | Melt Strength (cN) | 3.79 | 3.73 | 3.22 | 2.80 | 0.20 | 0.76 | 0.50 |
|  | Melt Tension (gf, @ 230° C.) | 6.01 | ND | ND | 4.43 | 5.01 | 4.22 | 4.5 |
|  | Shear Thining Index (STI) | 21.3 | 30.5 | 32 | 18.7 | 37.9 | 44.2 | 50.7 |
|  | Modulus Ratio Index (MRI) | 167.0 | 100.4 | 97.9 | 164.2 | 44.2 | 40.8 | 30.3 |
|  | Relaxation Time, T0 (s) | 1.85 | 1.97 | 1.90 | 1.66 | 243.14 | 65.88 | 447.05 |
|  | LCBI | 0.07 | 0.07 | 0.06 | 0.11 | 0.46 | 0.28 | 0.65 |

TABLE 3

| Div. | Item | Example 1 | Example 2 | Example 3 | Comparative Example 1 | Comparative Example 2 | Comparative Example 3 | Comparative Example 4 |
|---|---|---|---|---|---|---|---|---|
| Sheet properties | Yield Point Tensile Strength (kg/cm$^2$) | 265 | 255 | 270 | 277 | 248 | 265 | 253 |
| | Elongation (%) | 776 | 753 | 766 | 770 | 804 | 784 | 754 |
| | Flexural modulus (kg/cm$^2$) | 11651 | 11439 | 11537 | 12169 | 10213 | 11281 | 11296 |
| | Izod impact strength (Notch, Room temp., kgcm/cm) | 18.8 | 33.3 | 32.7 | 22.0 | 28.7 | 23.3 | 16.9 |
| | Izod impact strength (Notch, −20° C., kgcm/cm) | 10.3 | 16.8 | 19.6 | 13.6 | 17.8 | 12.4 | 8.8 |

TABLE 4

| Div. | Item | Example 1 | Example 2 | Example 3 | Comparative Example 1 | Comparative Example 2 | Comparative Example 3 | Comparative Example 4 |
|---|---|---|---|---|---|---|---|---|
| Pipe properties | HS (20° C. @12.4 MPa) → ISO standard more than 100 hr | 209.9 | >332 | 401 | >255 | >215 | >110 | 217 |
| | HS (80° C. @ 5.4 MPa) → ISO standard more than 165 hr | 213 | >1370 | >313 | >215 | >200 | >200 | >200 |

TABLE 5

| Div. | Item | Example 1 | Example 2 | Example 3 | Comparative Example 1 | Comparative Example 2 | Comparative Example 3 | Comparative Example 4 |
|---|---|---|---|---|---|---|---|---|
| Pipe formability (200° C.) | Resin melt pressure (Bar) | 96.7 | 107.5 | 106.5 | 114.6 | 116.8 | 114.2 | 99.7 |
| | Ampere (A) | 61.7~64.4 | 64.4~68.0 | 64.6~68.8 | 66.5~69.4 | 67.7~71.5 | 66.8~70.1 | 62.1~65.4 |
| | Screw revolutions (rpm) | 64 | 64 | 64 | 64 | 64 | 64 | 64 |
| | Motor revolutions (rpm) | 970 | 970 | 970 | 970 | 970 | 970 | 970 |
| | Extrusion amount (g/min) | 740.0 | 766.7 | 776.7 | 678.3 | 748 | 773 | 767.7 |
| | Extrusion amount/ Resin melt pressure | 7.7 | 7.1 | 7.3 | 5.9 | 6.4 | 6.8 | 7 7 |
| | Pipe surface | Good | Good | Good | Bad | Good | Good | Good |

The analytical results of the weight average molecular weight, Z average molecular weight, Z+1 average molecular weight, low molecular weight content and dissolution temperature according to the sampling position in the molded pipes of the polymers of Examples 1 to 3 and Comparative Example 1 and the polyethylene products of Comparative Examples 2 to 4 are shown in Table 6 below.

TABLE 6

| Div. | Pipe sampling position | Example 2 | Comparative Example 1 | Comparative Example 4 |
|---|---|---|---|---|
| Mw | Center (A) | 204,966 | 175,441 | 244,754 |
| | Outside (B) | 209,657 | 174,158 | 225,700 |

TABLE 6-continued

| Div. | Pipe sampling position | Example 2 | Comparative Example 1 | Comparative Example 4 |
|---|---|---|---|---|
| Mz | A | 1,061,098 | 913,630 | 2,358,007 |
|  | B | 1,123,767 | 908,164 | 2,036,455 |
| Mz + 1 | A | 2,065,774 | 1,733,105 | 5,729,000 |
|  | B | 2,503,773 | 1,724,060 | 4,639,116 |
| LMW % | A | 58.3 | 58.7 | 63.8 |
|  | B | 57.5 | 60.2 | 67.0 |
| Mw <10,000, % | A | 15.5 | 18.7 | 23.9 |
|  | B | 14.7 | 19.5 | 24.5 |
| Mw >1,000,000, % | A | 7.5 | 5.8 | 9.7 |
|  | B | 7.7 | 5.6 | 8.9 |
| Tm | A | 130.0 | 128.0 | 129.4 |
|  | B | 129.3 | 128.4 | 129.7 |

TABLE 7

| Div. (Center A → Outside B) | Example 2 | Comparative Example 1 | Comparative Example 4 |
|---|---|---|---|
| ΔMw (%) | 2.24 | −0.74 | −8.44 |
| ΔMz (%) | 5.58 | −0.60 | −15.79 |
| ΔMz + 1 (%) | 17.49 | −0.52 | −23.49 |
| ΔLMW (%) | −1.39 | 2.49 | 4.78 |
| ΔMw <10,000 (%) | −5.44 | 4.10 | 2.45 |
| ΔMw >1,000,000 (%) | 2.60 | −3.57 | −8.99 |
| ΔTm (%) | −0.54 | 0.31 | 0.23 |

FIG. 1 is GPC data of the polyethylene polymers obtained in Examples 1 to 3 and Comparative Examples 1 to 4 of the present invention. As shown in FIG. 1, GPC analysis of the polyethylene polymers obtained in Examples 1 to 3 and Comparative Example 1 all show a bimodal form, and GPC analysis of the polyethylene of Comparative Example 2 which is commercially available shows a monomodal form, and the GPC of the polyethylene of Comparative Examples 3 to 4 shows a bimodal form.

As shown in Table 2 and FIG. 1, the weight average molecular weights (Mw) of polyethylene in Examples 1 to 3 and Comparative Example 1 are much lower than the weight average molecular weights of commercially available polyethylene in Comparative Examples 2 to 4. In general, polyethylene having a high weight average molecular weight is known to have excellent physical properties of impact strength and long-term properties as compared to polyethylene having a relatively low weight average molecular weight. For this reason, to increase the physical properties of the product, the weight average molecular weight thereof is increased to the extent that the processability of the product is not reduced. However, as shown in Tables 3 and 4, the polyethylene of Examples 1 to 3 of the present invention has a relatively low weight average molecular weight but exhibits better impact strength and long-term properties.

Also, from the viewpoint of moldability, as shown in Table 2, the melt flow index and the melt flow index ratio of Example 3 show a very low value as compared with Comparative Examples 1 to 4. This means that the viscosity in the molten state during the molding process is high and the viscosity is high even under the processing conditions with high strain. However, as shown in Table 5, a lower melt pressure and motor ampere are shown during pipe forming in the extruder. This is because the weight average molecular weight in Example 3 is relatively low compared with Comparative Examples 2 to 4 is, and thus the viscosity is lower in the high strain region.

Figure 2:
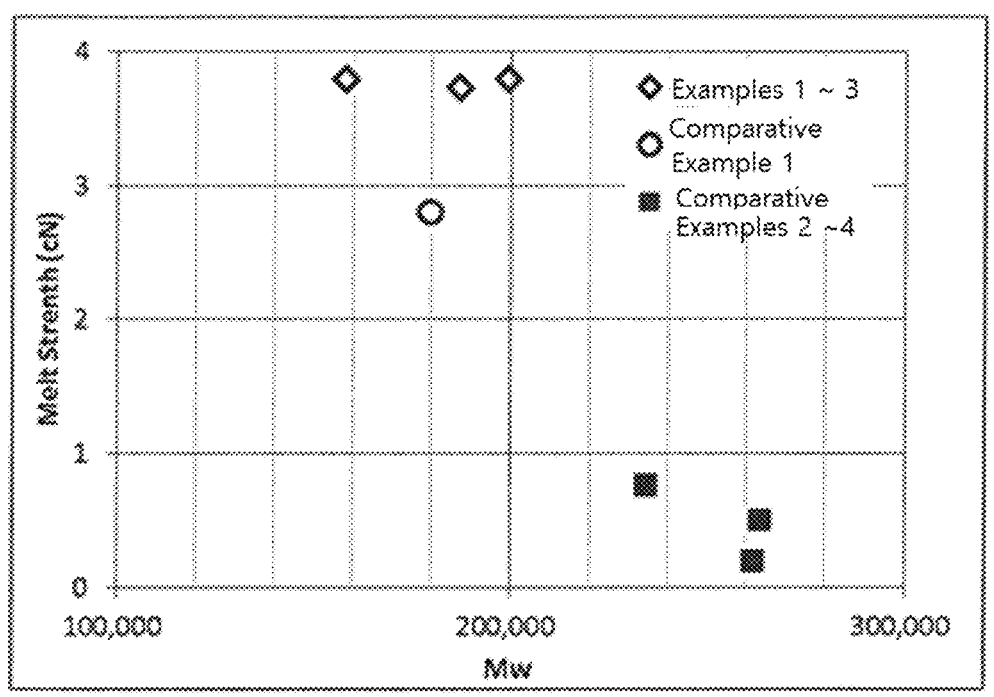
FIG. 2 is a graph showing a relation between a molecular weight and a melt strength of polyethylene obtained in Examples 1 to 3 of the present invention and Comparative Examples 1 to 4.
Figure 3:
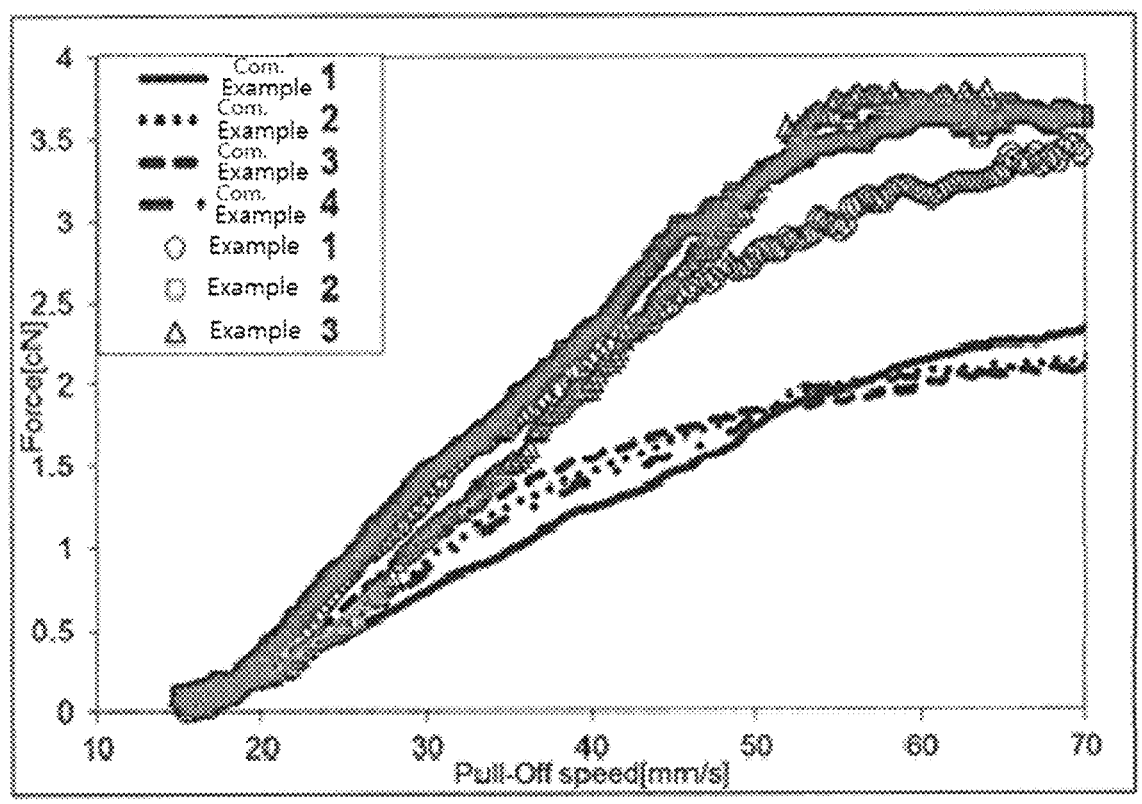
FIG. 3 is a graph showing a relationship between the pull-off speed and the melt strength of the polyethylene obtained in Examples 1 to 3 of the present invention and Comparative Examples (Com. Examples) 1 to 4.

It is also important to prevent sagging during pipe forming. In order to increase the dimensional stability, it is important to increase the melt tension and the melt strength. To this end, it is generally intended to increase the content of polymer with a weight average molecular weight of 1,000,000 g/mol or more. More preferably, the more the ultrahigh molecular weight polymer having a weight average molecular weight of 10,000,000 g/mol or more, the more the sagging phenomenon is reduced. However, as shown in Table 2 and FIG. 1, the content of a weight average molecular weight of 1,000,000 g/mol or more in Examples 1 to 3 and Comparative Example 1 is much lower than that in Comparative Examples 2 to 4. On the other hand, as shown in FIGS. 2 and 3, the polymers of Examples 1 to 3 exhibit a very high melt tension and melt strength as compared with Comparative Examples 2 to 4.

To prepare polymer showing high melt tension and melt strength, there is a method of increasing the content of polymer with a weight average molecular weight of 1,000,000 g/mol or more as mentioned in the above description. As another approach, there is a method of increasing the number of a long chain branch. However, to produce products having long-term properties such as pipes, it is necessary to minimize the long chain branch which reduces the long-term properties. Thus, LCBI (Long Chain Branch Index) values defined in Macromolecules 1999, 32, 8454-8464 were analyzed and shown in Table 2. The LCBI values of Examples 1 to 3 show a very low value compared with the LCBI values of Comparative Examples 1 to 4. As a result, it is considered that polymers in Examples 1 to 3 can show high melt tension and high melt strength since the long chain branching group for reducing long-term physical properties therein is small and the combination of polymer chains is different from that of the polymer chains in Comparative Examples 1 to 4.

It is also important to prevent surface roughness (melt fracture) during pipe forming. Polymers used for pipes generally exhibit high weight average molecular weights in order to increase long term properties. Such high molecular weight and high melt viscosity may cause surface roughness during molding. This is because of the phenomenon that is caused by the fact that polymers having relatively low molecular weights move from the inside of the pipe into the outer surface of the pipe due to chain migration in the extruder during molding, which is explained in the literature "POLYMER ENGINEERING AND SCIENCE, JULY 2004, Vol. 44, No. 7". Here, in the case of a pipe, the term "inside of the pipe" means, for example, a central portion of the thickness of the pipe. Since relatively low molecular weight polymers located on the outer surface of the pipe have low modulus of elasticity, it is difficult to retain the frictional energy generated in the extruder wall, and when being discharged outside the extruder, energy is released to cause surface roughness. Here, the term "the outer surface of the pipe" means a surface that abuts an empty space in the inside of a pipe and a surface exposed to the outside. In order to prevent this, it is necessary to suppress the movement of polymer chains having a relatively low molecular weight inside the extruder in the outer direction. For this purpose, in the present invention, the introduction of a third polymer having a relatively high molecular weight as compared to the low molecular weight polymer and a relatively low molecular weight as compared with the high molecular weight polymer was carried out in the bimodal polymer in Comparative Example 1 of the present invention. This was achieved through the third organo-transition metal compound described in Preparation Example 2. In order to demonstrate the chain movement inhibiting effect by the third polymer claimed in the present invention, the pipe was molded as in Preparation Example 3, and a sample was taken at the position described in FIG. 4, and gel permeation chromatography (GPC) and DSC analysis were carried to check the weight average molecular weight and the melting temperature (Tm) depending the taken position.

As shown in Table 6, the samples taken at the outer position (B) of Comparative Example 1 having the bimodal form without the third polymer and the commercially sold Comparative Example 4 had relatively low average molecular weight, Z average molecular weight, and Z+1 average molecular weight as compared with the samples taken at the center position (A).

In addition, in bimodal products, due to processing characteristics and polymer properties, density of polymers with relatively low molecular weight is relatively higher than that of polymers with relatively high molecular weight. According to melting temperature through DSC analysis in Table 6, the melting temperature of the samples taken at the outer positions (B) of Comparative Examples 1 and 4 is higher than that at the center position (A).

The difference in the molecular weight and the melting temperature depending on each sampling position means that the polymer chains having relatively short length move into the wall having a relatively high stress (friction energy) in the extruder, which means that the polymer chains having a relatively long length and a high modulus of elasticity (G') move into the center having relatively low energy in the extruder, for energy equilibrium.

As shown in Tables 6 and 7, a weight-average molecular weight, a Z-average molecular weight and a Z+1 average molecular weight of the sample taken from the outside position (B) in Example 2 had increased by 2% or more, 5% or more and 15% or more, respectively, in comparison with the sample collected at the center position (A). This allows chains with relatively high molecular weight and high modulus of elasticity to retain high frictional energy generated from the wall of the extruder without releasing it, when discharged outside the extruder, while being present on the outer surface of the sample. Through such evaluations, it has been proved that the third polymer suppresses the chain movement of the first polymer and the second polymer so that the surface roughness (melt fracture) does not occur.

Overall, from Table 3 of sheet properties, Example 3 of the present invention showed the best Izod impact strength at low temperature and at room temperature Izod impact strength.

From Table 5 showing pipe formability, the polymer of Example 3 has the lowest melt flow index, but the highest extrusion amount even though having low the resin melt pressure and motor ampere by 10% or more with respect to the polymers of Comparative Examples 1 to 3, so that it had excellent moldability. Through this, high moldability could be obtained by using low energy. Notwithstanding such high formability, the result of water pressure resistance test on the pipe showed that Examples 1 to 3 were equal to or better than Comparative Examples 1 to 4. Therefore, the polyethylene of the present invention has superior moldability and appearance while realizing the product having same physical properties as those of conventional polyethylene, and thus the polyethylene of the present invention has the advantage of increasing the productivity of molded products with the same energy consumption.

In addition, the molecular weight distributions obtained from gel permeation chromatography (GPC) for the respective polyethylene in Examples 1 to 3 and Comparative Examples 1 to 4 are shown in FIG. 1. FIG. 2 is a graph showing the relationship between the molecular weight and the melt strength of the polyethylene obtained in Examples 1 to 3 and Comparative Examples 1 to 4 of the present invention. FIG. 3 is a graph showing the relationship between the pull-off speed and the melt strength of the polyethylene obtained in Examples 1 to 3 and Comparative Examples 1 to 4 of the present invention. As shown in FIGS. 2 and 3, the polyethylene obtained in Examples 1 to 3 exhibits relatively excellent melt strength as compared with the polyethylene obtained in Comparative Examples 1 to 4, and shows melt strength similar to that of Comparative Examples 1 to 4 when the pull-off speed was low, and the required force increases as the pull-off speed increases so that melt strength is excellent.

Figure 4:
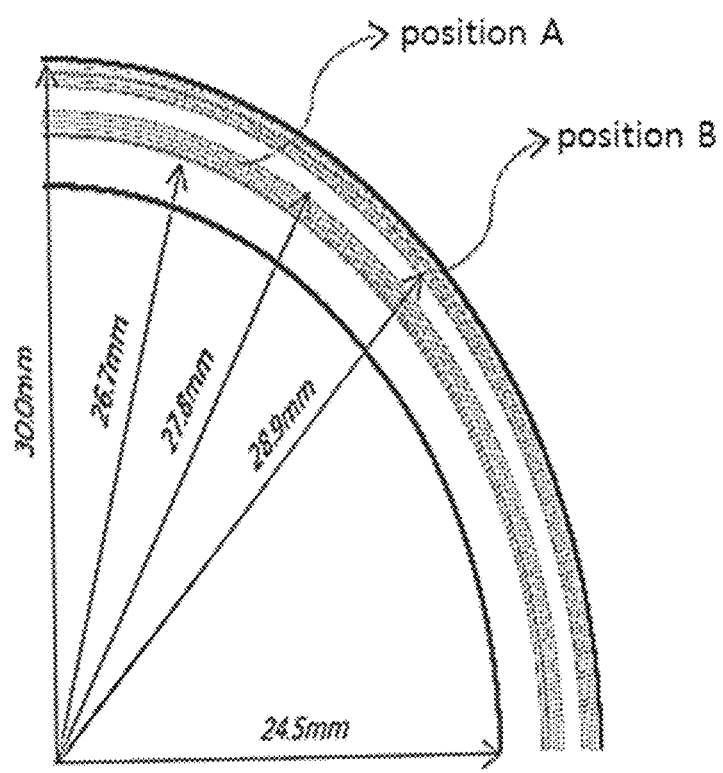
FIG. 4 is an illustration showing a sampling position of a pipe formed with polyethylene obtained in Example 2 of the present invention and Comparative Examples 1 and 4.

FIG. 4 is a view showing a sampling position of a pipe formed with polyethylene obtained in Example 2, Comparative Example 1, and Comparative Example 4. As shown in FIG. 4, a sample was taken according to FIG. 4 and the following definition 1 for molecular weight analysis depending on the position of the formed pipe.

[Definition 1]

In a molded pipe having an SDR (SDR (Standard Dimension Ratio)=od/en) of 2 to 20, $$\text{position } A = \frac{id}{2} + (en \times 0.4) - \frac{id}{2} + (en \times 0.6) \text{ From pipe center}$$

$$\text{position } B = \frac{id}{2} + (en \times 0.8) - \frac{id}{2} + (en \times 1.0) \text{ From pipe center}$$

where id is the inner diameter, od is the outside diameter, and en is the wall thickness.

The invention claimed is:

1. A polyolefin resin satisfying the following requirements (1) to (7):
   (1) a density (d) is 0.930 to 0.960 g/cm$^2$;
   (2) a melt flow index (MIP, 190° C., 5.0 kg load condition) is 0.01 to 10.0 g/10 minutes;
   (3) a ratio (Mw/Mn, molecular weight distribution (MWD)) of weight average molecular weight (Mw) to number average molecular weight (Mn) which is measured by gel permeation chromatography (GPC) is in the range from 10 to 60;
   (4) two or more peaks of molecular weight appear when measured by gel permeation chromatography (GPC);
   (5) in a molded pipe, a weight average molecular weight (Mw) of the polymer taken at position B of Definition 1 below is 0.1% greater than a weight average molecular weight (Mw) of the polymer taken at position A;
   (6) in a molded pipe, content of the polymer having a weight average molecular weight (Mw) of 10,000 or less in polymer taken at position A of Definition 1 below is 0.1% greater than the content of the polymer having a weight average molecular weight (Mw) of 10,000 or less in the polymer taken at position B;
   (7) in a molded pipe, content of the polymer having a weight average molecular weight (Mw) of 1,000,000 or greater in the polymer taken at position B of Definition 1 below is 0.1% greater than a content of the polymer having a weight average molecular weight (Mw) of 1,000,000 or greater in the polymer taken at position A;
   [Definition 1]
   in a molded pipe having an SDR (SDR (Standard Dimension Ratio)=od/en) of 2 to 20, $$\text{position } A = \frac{id}{2} + (en \times 0.4) - \frac{id}{2} + (en \times 0.6) \text{ From pipe center}$$

$$\text{position } B = \frac{id}{2} + (en \times 0.8) - \frac{id}{2} + (en \times 1.0) \text{ From pipe center}$$

where id is an inner diameter, od is an outside diameter, and en is a wall thickness.

2. The polyolefin resin as claimed in claim 1, wherein the density (d) is 0.934 to 0.954 g/cm$^2$; the melt flow index (MIP, 190° C., 5.0 kg load condition) is 0.1 to 1 g/10 minutes; the ratio (Mw/Mn, MWD) of weight average molecular weight (Mw) to number average molecular weight (Mn) is 12 to 50 measured by gel permeation chromatography; a weight average molecular weight (Mw) of the polymer taken at position B of Definition 1 is 1% greater than a weight average molecular weight (Mw) of the polymer taken at position A; content of the polymer having a weight average molecular weight (Mw) of 10,000 or less in polymer taken at position A of Definition 1 is 1% greater than the content of the polymer having a weight average molecular weight (Mw) of 10,000 or less in the polymer taken at position B; and the content of the polymer having a weight average molecular weight (Mw) of 1,000,000 or greater in the polymer taken at position B of Definition 1 below is 1% greater than a content of the polymer having a weight average molecular weight (Mw) of 1,000,000 or greater in the polymer taken at position A.

3. The polyolefin resin as claimed in claim 1, wherein the polyolefin resin has a weight average molecular weight (Mw, measured by gel permeation chromatography) of 100,000 to 400,000.

4. The polyolefin resin as claimed in claim 1, wherein the olefin resin has a melt flow index ratio (SR) of 10 to 300.

5. The polyolefin resin as claimed in claim 1, wherein the olefin resin has a relaxation time of 400 seconds or less.

6. The polyolefin resin as claimed in claim 1, wherein the olefin resin has a Shear Thining Index (STI) of 20 to 100.

7. The polyolefin resin as claimed in claim 1, wherein the olefin resin has a modulus ratio index (MRI) of 20 to 200.

8. The polyolefin resin as claimed in claim 1, wherein the olefin resin has a Long Chain Branch Index (LCBI) of 1/1,000 C or less.

9. The polyolefin resin as claimed in claim 1, further satisfying the following requirements (10) and (11):
   (10) in a pipe water pressure test, which measures the time at which a pipe is broken by applying a stress corresponding to a pressure of 5.4 MPa with water at 80° C. in accordance with KS M 3408, the pipe breaking time exceeds 165; and
   (11) in a pipe water pressure test, which measures the time at which a pipe is broken by applying a stress corresponding to a pressure of 12.4 Mpa is applied with water at 20° C. in accordance with KS M 3408, the pipe breaking time exceeds 100 hours.

10. The polyolefin resin as claimed in claim 1, wherein the polyolefin resin is a homopolymer or a copolymer of an olefin monomer selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidene norbornene, phenyl norbornene, vinyl norbornene, dicyclopentadiene, 1,4-butadiene, 1,5-butadiene, 1,5-pentadiene, 1,6-hexadiene, styrene, α-methylstyrene, divinylbenzene, 3-chloromethylstyrene and mixture thereof.

11. The polyolefin resin as claimed in claim 1, wherein the polyolefin resin comprises 97 to 99.99% by weight of a main resin selected from ethylene, propylene, and mixtures thereof; and 0.01 to 3% by weight of a constituent unit derived from α-olefin having 4 to 10 carbon atoms.

12. A polyolefin resin satisfying the following requirements (1), (2), (8) and (9):
   (1) a density (d) is 0.930 to 0.960 g/cm$^2$;
   (2) a melt flow index (MIP, 190° C., 5.0 kg load condition) is 0.01 to 10.0 g/10 minutes;
   (8) in a molded pipe, Z average molecular weight (Mz), measured by gel permeation chromatography (GPC), of the polymer taken at position B of Definition 1 below is 0.1% greater than the Z average molecular weight (Mz) of the polymer taken at position A; and
   (9) in a molded pipe, Z+1 average molecular weight (Mz+1), measured by gel permeation chromatography (GPC), of the polymer taken at position B of Definition 1 below is 1% greater than the Z+1 average molecular weight (Mz+1) of the polymer taken at position A;

[Definition 1]
in a molded pipe having an SDR (SDR (Standard Dimension Ratio)=od/en) of 2 to 20, $$\text{position } A = \frac{id}{2} + (en \times 0.4) - \frac{id}{2} + (en \times 0.6) \text{ From pipe center}$$

$$\text{position } B = \frac{id}{2} + (en \times 0.8) - \frac{id}{2} + (en \times 1.0) \text{ From pipe center}$$

where id is an inner diameter, od is an outside diameter, and en is a wall thickness.

13. The polyolefin resin as claimed in claim 12, wherein the density (d) is 0.934 to 0.954 g/cm$^3$; a melt flow index (MIP, 190° C., 5.0 kg load condition) is 0.1 to 1 g/10 minutes; in a molded pipe, Z average molecular weight (Mz), measured by gel permeation chromatography (GPC), of the polymer taken at position B of Definition 1 below is 1% greater than the Z average molecular weight (Mz) of the polymer taken at position A; and in a molded pipe, Z+1 average molecular weight (Mz+1), measured by gel permeation chromatography (GPC), of the polymer taken at position B of Definition 1 below is 5% greater than the Z+1 average molecular weight (Mz+1) of the polymer taken at position A.

14. The polyolefin resin as claimed in claim 12, wherein the Z average molecular weight (Mz, measured by gel permeation chromatography (GPC)) is 100,000 to 10,000,000, and the Z+1 average molecular weight (Mz+1, measured by gel permeation chromatography (GPC)) is 1,000,000 to 10,000,000.

15. The polyolefin resin as claimed in claim 12, wherein the olefin resin has a melt flow index ratio (SR) of 10 to 300.

16. The polyolefin resin as claimed in claim 12, wherein the olefin resin has a relaxation time of 400 seconds or less.

17. The polyolefin resin as claimed in claim 12, wherein the olefin resin has a Shear Thining Index (STI) of 20 to 100.

18. The polyolefin resin as claimed in claim 12, wherein the olefin resin has a modulus ratio index (MRI) of 20 to 200.

19. The polyolefin resin as claimed in claim 12, wherein the olefin resin has a Long Chain Branch Index (LCBI) of 1/1,000 C or less.

20. The polyolefin resin as claimed in claim 12, wherein the melt strength measured by a capillary rheological equipment is 1 cN or greater.

21. The polyolefin resin as claimed in claim 12, wherein the polyolefin resin is a homopolymer or a copolymer of an olefin monomer selected from the group consisting of ethylene, propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidene norbornene, phenyl norbornene, vinyl norbornene, dicyclopentadiene, 1,4-butadiene, 1,5-butadiene, 1,5-pentadiene, 1,6-hexadiene, styrene, α-methylstyrene, divinylbenzene, 3-chloromethylstyrene and mixture thereof.

22. The polyolefin resin as claimed in claim 12, wherein the polyolefin resin comprises 97 to 99.99% by weight of a main resin selected from ethylene, propylene, and mixtures thereof; and 0.01 to 3% by weight of a constituent unit derived from α-olefin having 4 to 10 carbon atoms.

* * * * *